United States Patent [19]

Seegmiller

[11] Patent Number: 5,137,353
[45] Date of Patent: Aug. 11, 1992

[54] ANGULAR DISPLACEMENT MEASURING DEVICE

[75] Inventor: H. Lee B. Seegmiller, Los Gatos, Calif.

[73] Assignee: The United States of America as represented by the Administrator of the National Aeronautics and Space Administration, Washington, D.C.

[21] Appl. No.: 774,490

[22] Filed: Oct. 10, 1991

[51] Int. Cl.⁵ ............................................. G01B 11/16
[52] U.S. Cl. ..................................... 356/152; 356/34; 250/225
[58] Field of Search ................... 356/152, 33, 34, 35.5, 356/364, 369; 250/225, 231 SE; 73/583, 800, 802

[56] References Cited

U.S. PATENT DOCUMENTS

| | | |
|---|---|---|
| 4,173,412 | 11/1979 | Ramsay et al. |
| 4,321,831 | 3/1982 | Tomlinson et al. |
| 4,420,251 | 12/1983 | James et al. |
| 4,688,934 | 8/1987 | Clark |
| 4,761,073 | 8/1981 | Meltz et al. |
| 4,788,868 | 12/1988 | Wilk |
| 4,806,012 | 2/1989 | Meltz |

Primary Examiner—Mark Hellner
Attorney, Agent, or Firm—Darrell G. Brekke; Guy Miller; John R. Manning

[57] ABSTRACT

A system for measuring the angular displacement of a point of interest on a structure, such as aircraft model within a wind tunnel, includes a source of polarized light located at the point of interest. A remote detector arrangement detects the orientation of the plane of the polarized light received from the source and compares this orientation with the initial orientation to determine the amount or rate of angular displacement of the point of interest. The detector arrangement comprises a rotating polarizing filter and a dual filter and light detector unit. The latter unit comprises an inner aligned filter and photodetector assembly which is disposed relative to the periphery of the polarizer so as to receive polarized light passing the polarizing filter and an outer aligned filter and photodetector assembly which recives the polarized light directly, i.e., without passing through the polarizing filter. The purpose of the unit is to compensate for the effects of dust, fog and the like. A polarization preserving optical fiber conducts polarized light from a remote laser source to the point of interest.

19 Claims, 2 Drawing Sheets

ANGULAR DISPLACEMENT MEASURING DEVICE

ORIGIN OF THE INVENTION

The invention described herein was made by an employee of the United States Government and may be manufactured and used by or for the government for governmental purposes without the payment of any royalties thereon or therefor.

BACKGROUND OF THE INVENTION

1. Technical Field of the Invention

This invention relates to devices and systems for measuring the angular displacement or rate of displacement of a point or area of interest of a structure, such as the amount of twist of a wing of an aircraft model in a wind tunnel.

2. Description of the Prior Art

Although as will be apparent, and as is discussed below, the invention is not limited to such an application, one important application of the invention is in providing remote, dynamic measurement of the angular rotation (twist) of a wind tunnel model, or other models or structures, under load. Prior art techniques have often relied on the use of strain gages which, in use, are attached to the areas of interest of the structure under load and which require accurate calibration. Further, the load distribution on the model or other structure will affect the twist or other angular displacement at the locations of interest in a complex manner which cannot be fully determined, thereby giving rise to uncertainties in the accuracy of the measurements produced.

Another common technique uses a series of photographs taken under each test condition. This technique is of limited accuracy and requires laborious setup procedures and time-consuming analysis. Further, this technique obviously cannot provide real-time information.

Another technique of particular interest here is that disclosed in U.S. Pat. No. 4,688,934 (Clark). This patent discloses a rotating polarizer angle sensing system for measuring aeroelastic deformation of an aircraft wing in flight or in a wind tunnel which uses light from a linearly polarized light source. A carrier beam is produced, a small portion of which is reflected through a linear polarizer to a first photodetector for use as a reference and the remainder of which is transmitted to a retroreflector target located on the wing. The target reflects the light back to a second photodetector which produces an electrical output signal for comparison with the electrical output signal produced by the reference photodetector. An angle measurement signal is based on this comparison.

A serious disadvantage of the measurement system disclosed in the Clark et al patent concerns the use therein of an external light source and retroreflector in generating the measurement signals. In this regard, because the light must be transmitted from the source to the target, e.g., to the wind tunnel model, and reflected back from the target, anything in the light path that interferes with the light transmission such as fog, dust or the like will adversely affect the measurement. This may not be a problem in a wind tunnel environment but certainly would impair any measurements made outside of such a protected environment, particularly those made over any substantial distance such as measurements of the flutter of a wing of an actual aircraft or measurements made over distance in connection with a remote structure such as a bridge or the like.

Further, vibration of a structure such as a bridge will produce vibrations of the retroreflective target and this presents special problems in a system wherein light is both transmitted to and received from the retroreflective target.

Other patented devices of possible interest here include those disclosed in U.S. Pat. Nos. 4,173,412 (Ramsay et al); 4,321,831 (Tomlinson et al); 4,420,251 (James et al); 4,321,831 (Meltz et al); 4,788,868 (Wilk); and 4,806,012 (Meltz et al). Briefly considering these patents, the Meltz patents both disclose a distributed, spatially resolving optical fiber strain gauge wherein the core of the optical fiber is written with periodic grating patterns effective for transmitting and receiving light injected into the core. Strain is measured by determining spectral shifts between the transmitted and reflected light. The Ramsay et al patent discloses a strain sensor for measuring the magnitude of the strain in a single mode optical fiber using polarized light and a liner polarization analyzer. The Tomlinson et al patent discloses an apparatus for making optical pressure measurements wherein fiber optics are used to transport a polarized beam to a sensing head and a polarization analyzer is employed. The James et al patent discloses an optical sensor for determining fatigue, vibration, flex and the like at a monitored area using polarized light and an optical detector that is responsive to the phase or polarization angle of a reflected light signal. The Wilk patent discloses a strain measurement apparatus which measures the relative movement of one end of a cylindrical member with respect to the other end and which uses optical fibers.

SUMMARY OF THE INVENTION

In accordance with the invention, a system is provided for measuring the angular displacement or rotary oscillation rate of a point or points of interest on a model or other structure which effectively reduces or overcomes the disadvantages of the prior art. The system of the invention is based on detecting the plane of polarized light exiting from a model or structure at the point or points of interest and uses optical fibers to conduct light to such a point or points. The orientation of the plane of polarization of the light exiting from a point of interest is detected by a receiving unit comprising a rotating polarization filter and a dual filter and light detector unit. The latter includes inner and outer optical filter and photodetector units disposed relative to the periphery of the rotating polarization filter such that the inner unit receives the polarized light through the rotating polarization filter and the outer unit receives the light directly, i.e., without the light passing through the rotating filter. The output of the latter unit is used to correct the output from the former so as to compensate for the effects of dust, fog and other variable factors which affect the light transmission or the light source. The optical filters of the units are used to discriminate between light beams received from different points of interest.

Other features and advantages of the invention will be set forth in, or apparent from, the detailed description of preferred embodiments of the invention which follows.

DESCRIPTION OF THE PREFERRED EMBODIMENTS

Figure 1:
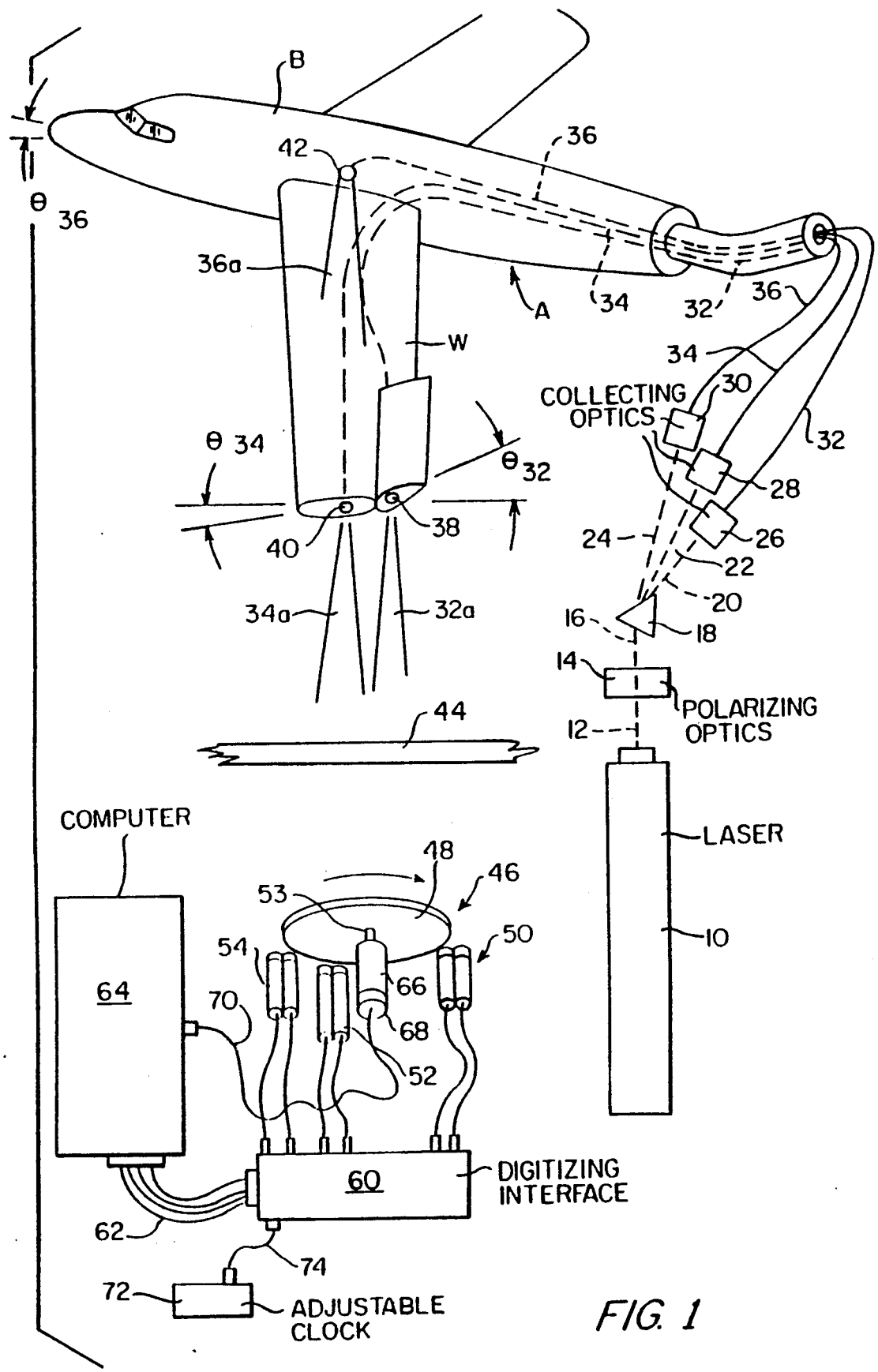
FIG. 1 is a schematic representation, partially in block diagram form, of a preferred embodiment of the angular displacement measurement system of the invention, as applied to an aircraft.

Referring to FIG. 1, there is shown a schematic representation of the angular displacement measurement system of the invention as applied to an aircraft model, denoted A, such as is used in a conventional wind tunnel. The sting on which the model is supported is not shown. As set forth hereinabove, although the invention provides particular advantages when used in the measurement of the dynamic twist of a wind tunnel model, the invention is also applicable to other models and other structures under load such as a bridge, a building or models of the same (as used in connection with an earthquake study, for example).

The measurement system of the invention includes a light source 10, such a laser, which produces a light beam 12. Beam 12 is received by a polarizing optical unit (polarizing optics) 14 which produces a polarized light beam 16. A dispersing prism 18 receives the polarized light beam 16 and produces, in this example, three polarized beams 20, 22, and 24, each having a different wavelength. (It is noted that if, for example, an argon laser is utilized for laser 10, at least six different wavelength beams can be produced by prism 18.) The polarized beams enter, i.e., are received by, respective light collectors (collecting optics) 26, 28 and 30 associated with respective polarization preserving optical fibers 32, 34 and 36 which are aligned and disposed to receive and conduct plain polarized light. Thus, in the exemplary embodiment under consideration, polarized light beams of three different wavelengths are caused to enter fibers 32, 34 and 36 and travel therealong inside of aircraft model A to different points of interest.

In the exemplary embodiment illustrated, optical fiber 32 is routed to a wing control surface of aircraft model A and exits at an opening at the outside end thereof at which a lens 38 is located, optical fiber 34 is routed to a wing W of model A so as to exit from an opening in wing W at which a lens 40 is located, and optical fiber 36 is routed to the body B of model A so as to exit from an opening in body B at which a further lens 42 is located. Lenses 38, 40 and 42 direct the polarizing light in the form of respective beams 32a, 34a and 36a to a remote receiving unit 46 described below. The planes of polarization of the corresponding beams 32a, 34a and 36a at these openings are rotated through angles $\Theta_{32}$, $\Theta_{34}$ and $\Theta_{36}$ by twisting, deflection, deformation or the like of the local model structure at the exit ends of the respective fibers 32, 34 and 36 at which lenses 38, 40 and 42 are respectively located. It is noted that in the specific application under consideration, assuming that the longitudinal flexure of the wing W of aircraft model A is negligible, the only way that the tip of the aircraft model wing W can "rotate" is by twisting.

Beams 32a, 34a and 36a, with their planes of polarization rotated as described above, pass through a viewing window 44 formed in the wind tunnel (not otherwise shown) in which aircraft model A is housed to the polarization detector arrangement 46. The detector arrangement comprises light beam receiving units 50, 52, 54 and a rotating polarization filter apparatus. A circular-shaped polarization filter 48 is spun by means of an adjustable-speed electric motor 66. For extremely high rotational speeds an adjustable-speed air turbine may be substituted for the electric motor. Filter 48 may be a disc made entirely of optical polarization filter material or it may be a disc whose central portion is metal and whose outer portion is a ring-shaped polarization filter. In operation, the speed of motor 66 is normally fixed at a rate in excess of the oscillation rate of the model. Mechanically coupled to motor 66 is an encoder 68 that generates a digital signal as motor 66 is rotated. The signal, which is a function of the angular or rotational position of the motor shaft 53 and filter 48, is connected to computer 64 by cable 70.

Figure 2:
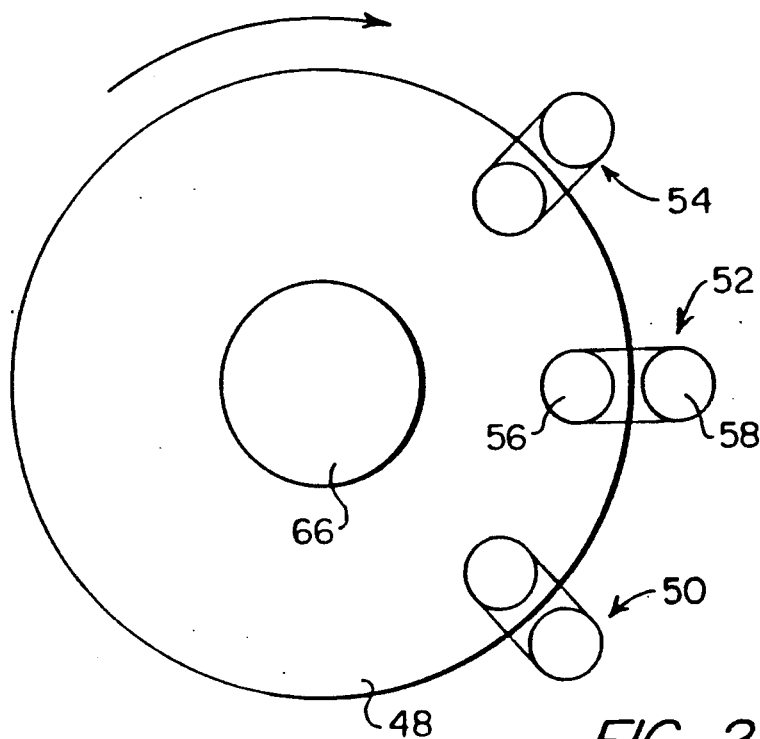
FIG. 2 is the schematic front elevation view, drawn to an enlarged scale, of a portion of a polarization detection arrangement shown in FIG. 1.
Figure 3:
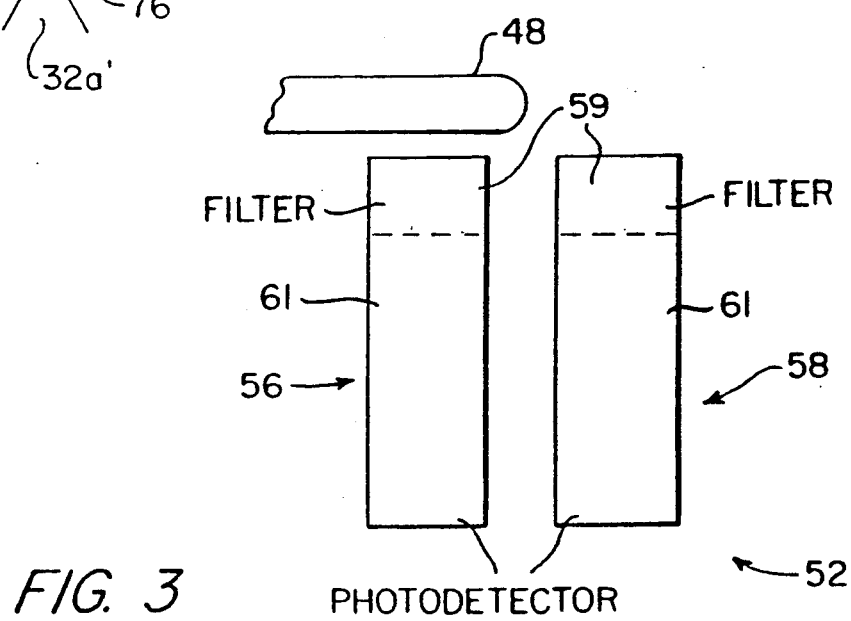
FIG. 3 is a schematic plan view, drawn to an enlarged scale, of one of the dual photodetector-dual optical filter units of the polarization detection arrangement of FIG. 1.

Each light beam receiving unit comprises dual detectors 56 and 58 (shown in FIGS. 2 and 3). Each detector includes a narrow band-pass optical filter 59 mounted in front of the photosensitive surface of a photodetector 61. The filter 59 in unit 50 permits the plane polarized light of beam 32a to reach the corresponding photodetectors 61 and rejects the beams 34a and 36a. Units 52 and 54 are similarly constructed so that the dual detectors of unit 52 only respond to beam 34a and the dual detectors of unit 54 only react to beam 36a.

In each light beam receiving unit the detectors 56 and 58 are electrically and optically identical; however, the detectors are arranged with respect to polarization filter 48 so that filter 48 overlaps detectors 56 but not detectors 58. Thus, the polarized light of each beam passes through filter 48 before reaching its respective detector 56 and passes directly to its respective detector 58 without the intervention of filter 48.

The use of dual detectors in the light receiving units permits accurate measurements to be carried out in the presence of air contaminants (fog, dust, etc.) or when the output of the light source 10 varies. At the beginning of a test, the light reaching each detector 58 from its respective beam is accurately measured and henceforth used as a reference. If during the test the light measured by detector 58 varies for a period, the signal generated by the corresponding detector 56 is altered by computer 64 a like amount for the same period. For example, if, during a test, dust causes the signal from photodetector 58 to decrease two per cent below the reference level, then the signal from the corresponding detector 56 is boosted the same amount (two per cent) during that interval.

Light beam receiving units 50, 52, 54 are connected to a digitizing interface 60 which includes an analog-to-digital converter (ADC) and converts the analog signals from the units to corresponding digital signals. The clock pulses for the analog-to-digital converter are supplied by adjustable clock 72 via cable 74. The resolution of the angular measurements is increased when the clock frequency (sampling rate) is increased. As polarization filter 48 is rotated, a signal having a sine wave shape is generated at each photodetector 61. One cycle of a sine wave is generated for each 180° rotation of the filter 48.

In operation, the polarization filter 48 is spun at a constant speed while aircraft model A is idle and under no load (no air flowing over the model). The phase relationship between the signal from each detector 56 and the signal from encoder 68 is measured. The measured phase relationship is the reference phase (for each detector 56). When the wind tunnel is energized and air flows over the model, the computer measures the real time phase relationship between each polarized light beam and the orientation of the filter 48 (as determined by encoder 68). The difference between the reference phase and the real time phase, i.e., the phase shift, is measured by the computer 64 and gives the angular orientation of the particular model point at the measurement instant. The change in phase so determined is, of course, directly related to the amount of angular rotation of the corresponding parts of the aircraft model A caused by such deflection, twisting, deformation or the like. The phase shift sampling rate is determined by the clock frequency of adjustable clock 72. Thus, the invention enables real time remote measurements to be made of model angular displacement under dynamic loading conditions. Further, the dual detectors permit accurate measurements to be carried out in the presence of air contaminants or light source fluctuations.

Although three model monitoring locations have been depicted in FIG. 1, it is to be understood that more or less locations may be employed as desired by utilizing more or fewer polarization-preserving optical fibers and related equipment.

When model A is vibrating or fluttering, a varying, measurable signal will be generated at each photodetector even when filter 48 is idle (due to the polarized beam rotation). This measurement process may be optimized by selection of the static orientation of filter 48 with respect to the polarized light beam. Accordingly, the frequency of vibration of a model point can be measured even when filter 48 is not turning. This measurement process may be desirable, for example, when the model vibration rate is extremely high (or the polarization filter rotation rate is inadequate).

Figure 4:
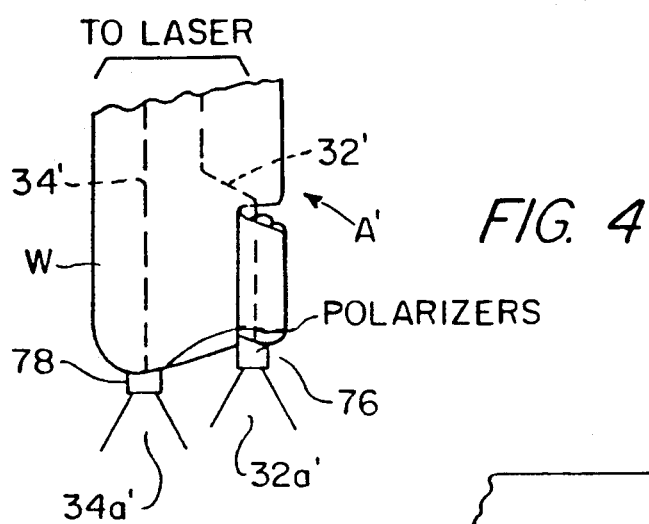
FIG. 4 is a schematic representation of a part of the system of FIG. 1 constructed in accordance with an alternative embodiment of the invention.

Referring to FIG. 4, an alternative embodiment of the invention is shown. FIG. 4 is similar to FIG. 1 but only shows a detail thereof and like elements in FIG. 4 are given the same reference numerals as in FIG. 1 but with primes attached. The only difference between the two embodiments is that in FIG. 4, polarizers or polarizing optics 76 and 78 are mounted on wing W of the aircraft model A' at the exit ends of optical fibers 32' and 34' and the common polarizer 14 is omitted. This embodiment has the advantage of eliminating the need for polarization preserving optical fibers.

It is also to be understood that the laser, corresponding to laser 10 of FIG. 1, together with the rest of the components associated with the light source, could be completely contained within the structure that is subject to rotation, e.g., a bridge, automobile, building or the like, or in models of the same.

Although the present invention has been described relative to specific exemplary embodiments thereof, it will be understood by those skilled in the art that variations and modifications can be effected in these exemplary embodiments without departing from the scope and spirit of the invention.

What is claimed is:

1. A measuring system for measuring the angular displacement of a point of interest on a structure, said measuring system comprising:
    a source of polarized light located on a structure at a point of interest the angular displacement of which is to be measured;
    detecting means for receiving polarized light from said source and for detecting the orientation of the plane of polarization of the polarized light received from said source, said detecting means including a rotating polarization filter, a first photodetector for detecting received light that passes through said filter and a second photodetector for detecting received light not passing through said rotating polarization filter; and
    means responsive to the outputs of said first and second photodetectors for determining the angular displacement of the structure at said point of interest.

2. A measuring system as claimed in claim 1 wherein said polarized light source comprises an optical fiber contained within the structure and exiting at one end thereof at the point of interest.

3. A measuring system as claimed in claim 2 wherein said polarized light source further comprises a laser located at a distance from said optical fiber for producing a light beam to be received by the optical fiber.

4. A measuring system as claimed in claim 3 wherein said optical fiber comprises a polarization preserving optical fiber and wherein the other end of said optical fiber is connected to collecting optics for receiving the polarized light beam.

5. A measuring system as claimed in claim 2 further comprising a light polarizer located at said one end of said optical fiber.

6. A measuring system as claimed in claim 1 further comprising means for monitoring the angular position of said rotating polarizing filter and for supplying a corresponding electrical output signal to the angular displacement determining means.

7. A measuring system as claimed in claim 1 wherein said angular displacement determining means comprises a computer and said system further comprises a timer for supplying clock signals to said computer.

8. A measuring system as claimed in claim 1 wherein said first and second photodetectors are commonly mounted in a dual photodetector unit.

9. A measuring system as claimed in claim 8 wherein said detecting means further comprises first and second optical filters commonly mounted in said dual photodetector unit in front of said first and second photodetectors, respectively.

10. A measuring system as claimed in claim 2 comprising a plurality of said optical fibers each exiting at one end thereof at a different point of interest on the structure.

11. A measuring system as claimed in claim 10 wherein detecting means further comprises filter means for discriminating between the light received from different fibers of said plurality of optical fibers.

12. A measuring system as claimed in claim 11 wherein light beams of different wavelengths are transmitted over said different optical fibers and said filter means comprises filters for discriminating between said light beams of different wavelengths.

13. A measuring system for measuring the angular displacement of a plurality of different points of interest on a structure, said system comprising:

a plurality of sources of polarized light, each said source producing a respective beam of polarized light, and each said source being disposed on the structure at a different one of a plurality of points of interest;

detecting means for receiving said beams of polarized light and for detecting the orientation of the plane of polarization of each of the beams, said detecting means comprising a rotating polarizer, and a plurality of dual filter and detector units equal in number to the number of beams, each of said filter and detector units comprising a first filter and light detector mounted in alignment and disposed so as to receive a corresponding beam of polarized light after passing through the rotating polarizer and a second filter and light detector mounted in alignment and disposed so as to receive said corresponding beam of polarized light directly, without said corresponding beam passing through said rotating polarizer; and computing means, responsive to the outputs of the first and second light detectors of each of said plurality of dual filter and detector units, for determining the angular displacement of the structure at each of said points of interest on the structure.

14. A measuring system as claimed in claim 13 wherein said polarized light sources each comprise an optical fiber contained within the structure and exiting at one end at the corresponding point of interest.

15. A measuring system as claimed in claim 14 wherein said polarized light source further comprises a laser for producing an initial light beam, polarizing optics for polarizing said initial light beam to produce a polarized initial beam, and a dispersing prism means for receiving the polarized initial beam and for converting said polarized initial beam into a plurality of beams each of a different wavelength.

16. A measuring system as claimed in claim 15 wherein said laser comprises an argon laser.

17. A measuring system as claimed in claim 15 wherein each said optical fiber comprises a polarization preserving optical fiber and wherein the other end of each said optical fiber is connected to corresponding collecting optics for receiving a corresponding one of said plurality of polarized light beams produced by said beam splitter means.

18. A measuring system as claimed in claim 13 further comprising a light polarizer disposed at said one end of said optical fiber.

19. A measuring system as claimed in claim 13 further comprising means for monitoring the angular position of said rotating polarizer filter and for supplying a corresponding electrical output signal to said computing means.

* * * * *